United States Patent [19]

Woodward

[11] Patent Number: 4,679,732
[45] Date of Patent: Jul. 14, 1987

[54] VECTORABLE EXHAUST NOZZLE FOR A GAS TURBINE ENGINE

[75] Inventor: Clifford S. Woodward, Bristol, England

[73] Assignee: Rolls-Royce plc, London, England

[21] Appl. No.: 760,767

[22] Filed: Jul. 31, 1985

[30] Foreign Application Priority Data

Aug. 16, 1984 [GB] United Kingdom ................. 8420799

[51] Int. Cl.[4] .............................................. B64C 15/00
[52] U.S. Cl. .................................. 239/265.35; 60/232
[58] Field of Search ....................... 239/265.35, 265.33, 239/265.19, 265.39; 244/12.5, 230; 60/228, 230, 232

[56] References Cited

U.S. PATENT DOCUMENTS

| 2,886,262 | 5/1959 | Fletcher | 244/23 |
|---|---|---|---|
| 3,441,220 | 4/1969 | Wildner | 239/265.35 |
| 3,485,450 | 12/1969 | Kurti et al. | 60/232 X |
| 3,687,374 | 8/1972 | Nash | 239/265.35 |
| 3,776,467 | 12/1973 | Riemerschmid | 60/232 X |
| 3,989,192 | 11/1976 | Enderle et al. | 239/265.35 |
| 3,989,193 | 11/1976 | Vedova | 239/265.35 |
| 4,000,854 | 1/1977 | Konarski | 239/265.39 |
| 4,550,877 | 11/1985 | Szuminski | 60/232 X |

FOREIGN PATENT DOCUMENTS

| 1210329 | 2/1966 | Fed. Rep. of Germany | 239/265.35 |
|---|---|---|---|
| 1108622 | 4/1968 | United Kingdom . | |
| 1122760 | 8/1968 | United Kingdom . | |
| 1381397 | 1/1975 | United Kingdom . | |
| 1491528 | 11/1977 | United Kingdom . | |
| 1499887 | 2/1978 | United Kingdom . | |

Primary Examiner—Johnny D. Cherry
Assistant Examiner—MaryBeth O. Jones
Attorney, Agent, or Firm—Parkhurst & Oliff

[57] ABSTRACT

A vectorable nozzle (17) comprises a fixed first duct (21), a rotatable second duct (22) scarfed at its downstream end, and a rotatable third duct (23) scarfed at its upstream end. The second and third ducts (22, 23) are mounted in bearings (24,26), respectively, and an epicyclic gear train (30) is provided to rotate them in opposite directions while maintaining the direction of gas efflux issuing from the nozzle (17) in a single plane.

8 Claims, 10 Drawing Figures

VECTORABLE EXHAUST NOZZLE FOR A GAS TURBINE ENGINE

This invention relates to vectorable nozzles for gas turbine engines, that is to say propulsion nozzles which can be directed selectively in predetermined directions relative to the remainder of the engine to produce propulsive thrust in selected directions.

An example of a gas turbine engine having vectorable nozzles is Rolls-Royce Limited's Pegasus gas turbine aero engine which is designed for the Harrier Jump Jet, the AV8A and AV8B aircraft.

The Pegasus engine, as designed for the above mentioned aircraft, comprises a by-pass type gas turbine engine in which part of the by-pass air is discharged through two vectorable nozzles and part is supplied to the core engine to drive the turbine and produce propulsive thrust. The hot efflux gases from the turbine are fed via a bifurcated jet pipe to two vectorable "hot" nozzles. By rotating the nozzles from a direction pointing rearwards to a position pointing downwards, the thrust produced by the nozzles may be selectively directed respectively forwards for forward flight or upwards for vertical take-off and landing.

Instead of discharging the efflux of hot gases from the engine's turbines through a bifurcated jet pipe and hence from two vectorable nozzles, it is known to provide a single jet pipe which can direct thrust selectively in pre-determined directions.

The scarfed nozzle is one design which provides vectorable thrust but in order to vector thrust from an upward direction to a forward direction in one plane, it is necessary to drive the various components of the nozzle at different speeds which vary during rotation.

The invention as claimed herein seeks to provide a vectorable exhaust nozzle for a gas turbine engine which maintains the thrust in a single plane during vectoring by means of a variable velocity ratio epicyclic gear train.

The present invention will now be described, by way of example, with reference to the accompanying drawings in which.

Figure 1:
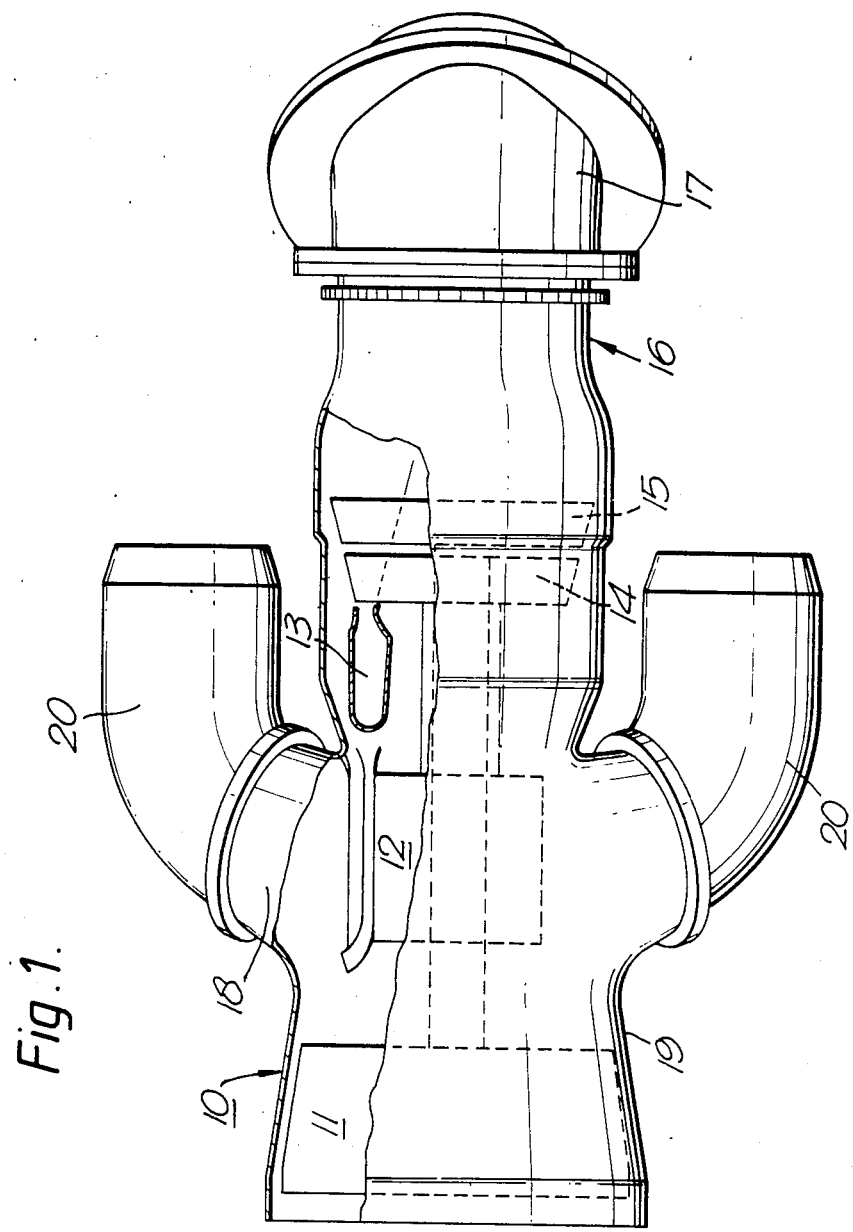
FIG. 1 illustrates, schematically, a plan view of a gas turbine engine fitted with a vectorable rear nozzle constructed in accordance with the present invention.

Referring to FIG. 1 there is shown a gas turbine aero engine 10 of the by-pass type. The engine comprises, in flow series, an axial flow low pressure compressor 11, an axial flow high pressure compressor 12, a combustion chamber 13, a high pressure turbine 14 which drives the H.P. compressor 12, a low pressure turbine 15 which drives the L.P. compressor 11, and a jet pipe 16 terminating in a vectorable nozzle 17 constructed in accordance with the present invention.

The L.P. compressor 11 supplies compressed air to the H.P. compressor 12 and to a plenum chamber 18 which forms part of the by-pass duct 19 and which terminates in two vectorable nozzles 20.

Figure 2:
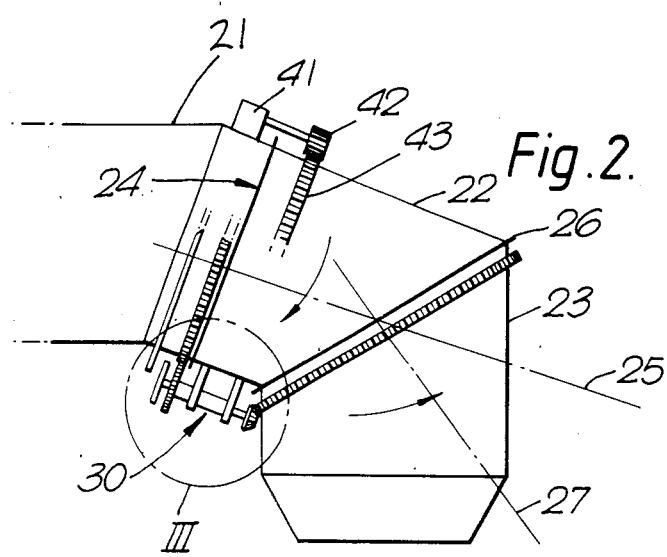
FIG. 2 illustrates a side view showing in greater detail the rear nozzle in FIG. 1.
Figure 4:
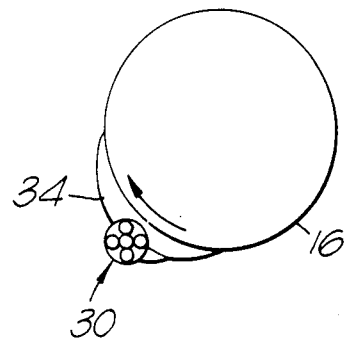
FIG. 4 shows a schematic view of some of the relevant operating parts of the nozzle of FIG. 2.
Figure 3:
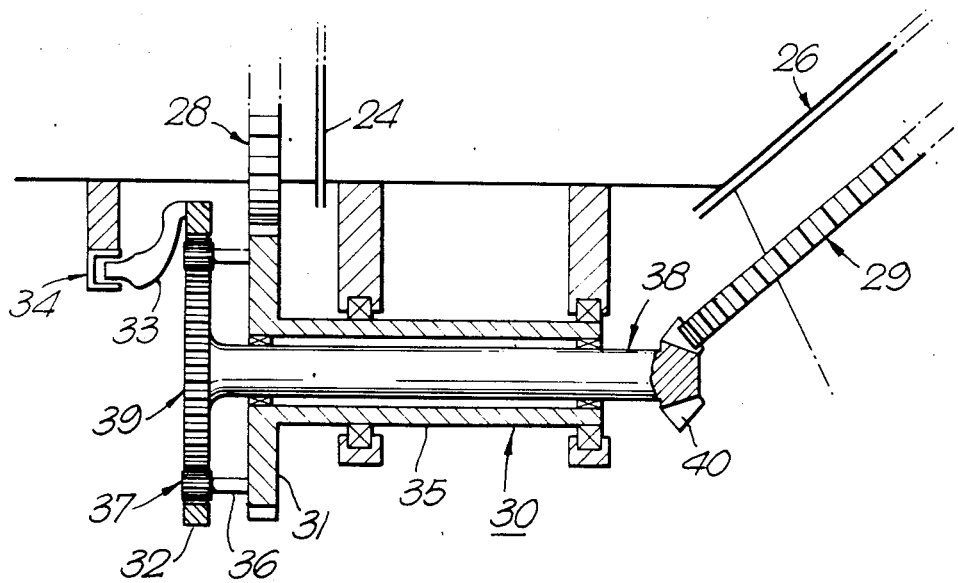
FIG. 3 illustrates the relevant operating parts of the nozzle in FIG. 2.

Referring now to FIGS. 2, 3 and 4, the nozzle 17 comprises a first fixed duct 21 and two rotatable ducts 22,23. A second duct 22 is mounted in bearings 24 for rotation about its longitudinal axis and is scarfed at its other end. That is to say that its end lies in a plane which is at an acute angle to the longitudinal axis 25 of the second duct 22. A third duct 23 is similarly scarfed so that its end adjacent to the second duct 22 is parallel to the end of the second duct. The third duct 23 is mounted in bearings 26 for rotation about an axis 27 which is always normal to the plane of the joint between the second and third ducts 22,23.

The duct 22 is of circular cross-sectional shape in the plane of the bearings 24 and in the plane of the joint between the ducts 22,23. Similarly the duct 23 is of circular cross-section in the plane of the joint between the ducts 22,23 and its outlet may be of circular, polygonal or rectangular shape.

Rotation of the second duct 22 about axis 25 can conveniently be achieved by actuating means shuch as an air motor or gearbox 41 driven by the engine. The gearbox drives a shaft on which is mounted a pinion 42 in mesh with a gear toothed rack 43 which extends part of the way round the second duct 22.

Rotation of the third duct 23 occurs simultaneously by way of epicyclic transmission means 30 mounted on the second duct 22 and rotatable therewith. The epicyclic transmission means 30 has two inputs; a first input member is a rotatable cage structure 36 on which are mounted a plurality of planet wheels 37, and a second input member being an annular gear 32 which is arranged to mesh with the planet wheels 37.

The cage 36 is driven by first co-operating means which may take the form of an input pinion 31 engaging a first gear-toothed rack 28 which extends part of the way round the fixed first duct 21 and is attached thereto. The first rack 28 lies parallel to the plane of the bearing 24. The input pinion 31, which is located by a shaft 35, is attached to the cage 36.

The annular gear 32 is driven by a third co-operating means which comprises a cam follower 33 engaging a cam 34. The cam 34 extends part of the way round the first duct 21 and is attached thereto. The cam follower 33 is attached to the annular gear 32 so as to rotate the annular gear 32 when the cam 34 acts on the follower 33.

The epicyclic transmission means 30 is also provided with an output member which in this arrangement is a sun pinion 39 that is in mesh with the planet pinions 37. The sun pinion 39 is attached via a shaft 38 to a second co-operating means comprising a bevelled second pinion 40 in mesh with a second gear-toothed rack 29 attached to the third duct 23.

In operation the second duct 22 is rotated about axis 25 by the air motor or gearbox 41 as described above.

The rotation of the second duct causes the epicyclic transmission means 30 which is mounted on the second duct 22 to move relative to the first rack 28 and the cam 34, thereby rotating the input pinion 31 and therefore the cage 36 together with the annular gear 32. The motion of the cage 36 will enable the planet wheels to revolve about the sun pinion shaft 38 and also rotate about their own axes thus causing the sun pinion 39 to rotate. Rotation of the sun pinion 39, and thus the bevelled output pinion 40, will make the third duct 23 rotate in an opposite direction relative to the second duct 22 and at a greater angular velocity.

It is necessary to vary the velocity ratio between the input pinion 31 and the output pinion 40 during rotation in order to maintain the direction of jet efflux in a single vertical plane. As the second duct 22 rotates relative to the first, the action of the cam follower 33 induces rotation of the annular gear 32 relative to the motion of the planet wheels 37 thus enabling variation in the velocity ratio between the pinion 31 and pinion 40.

When the nozzle is in a forward thrust position it is arranged so that the plane of the joint between ducts 22 and 23 is vertical but, when viewed from above, lies obliquely angled to axis 25 so that the longitudinal axes of all ducts 21, 22, 23 lie in a straight line when viewed from above. By rotating the second duct 22 90° relative to the first duct 21 while simultaneously rotating the third duct 23 180° relative to the second duct 22, but in an opposite direction to the rotation of the second duct 22, the following occurs. The joint between the second and third ducts 22, 23 is brought into a plane which when viewed from the side of the nozzle lies obliquely to the axis 25, and the longitudinal axis of the third duct 23 is effectively moved in a vertical plane to a position where it lies at an angle to the axis 25 when viewed from the side. In this position the outlet of the nozzle points downwards.

The profile of the cam 34 must be such that the annular gear 32 rotates to maintain a velocity ratio between the input pinion 31 and the output pinion 40 which ensures that the thrust is maintained in one vertical plane.

The movement of the second duct 22 and the third duct 23 can be determined from a formula for a given scarf angle.

Figure 5A:
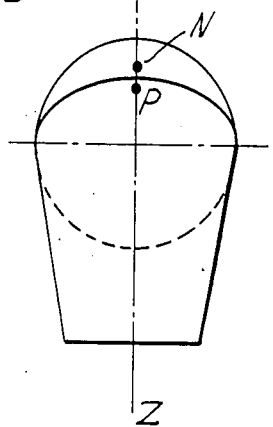
FIG. 5a depicts the nozzle, as viewed along the engine centreline from the rear of the engine, in a position in which the jet efflux is directed downward.
Figure 5B:
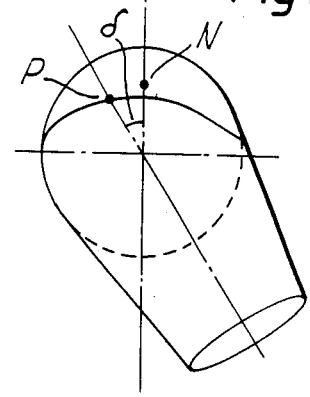
FIG. 5b shows the nozzle of FIG. 5a after a rotation such that the jet efflux is directed in a direction outside the single plane of vectoring.

Referring to FIG. 5a, consider a point P which lies on the circumference of the third duct 23 adjacent to the bearing 26. In the starting position of FIG. 5a, the point P is in the plane described by the line ZZ and the axis 25 (henceforth known as the vectoring plane) at the highest point of the third duct 23. If the third duct 23 is then rotated through an angle, δ, measured in the plane of the bearing 26, about the axis 27, relative to the fixed duct, the position shown in FIG. 5b will be attained.

Figure 5C:
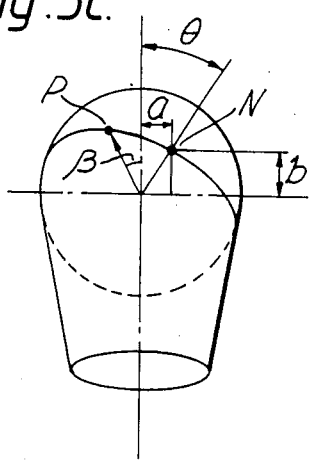
FIG. 5c shows the nozzle of FIG. 5b such that the jet efflux has been returned to the plane of vectoring but a component of the jet efflux now points rearward.

In order to return the direction of jet efflux to the vectoring plane, the second duct 22 is now rotated through an angle θ, relative to the first fixed duct, in an opposite direction to the previous rotation of the third duct 23 such that the position shown in FIG. 5c is now assumed. A component of the direction of the jet efflux now points rearward in the vectoring plane. In the present invention all rotations occur simultaneously.

In moving from the position shown in FIG. 5a to that shown in FIG. 5c the point P has now rotated through an angle reduced from δ to β because the rotation of second duct 22 carried the third duct 23 in an opposite direction to the original rotation of third duct 23. From FIG. 5c it will be seen that a point N, located in the plane of the bearing 24, which rotates with the second duct 22 and originally lay in the vectoring plane, has been rotated through an angle θ such that its coordinates are a, b from the intersection of axes 25 and 27.

Figure 5D:
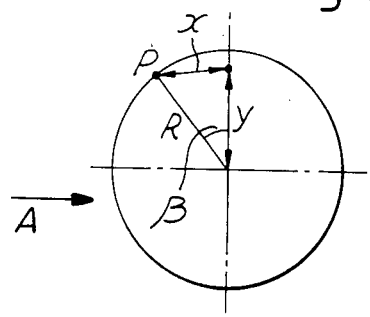
FIG. 5d is a view perpendicular to the plane of the bearing 26.
Figure 5E:
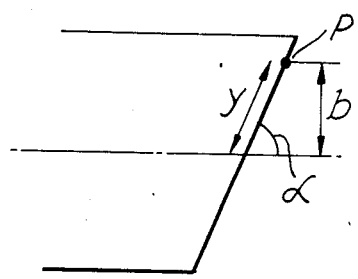
FIG. 5e is a view in the direction of arrow A in FIG. 5d.

From FIGS. 5d and 5e $$\tan\theta = \frac{a}{b} \quad 1$$

$$\sin\beta = \frac{x}{R} \quad 2$$

$$\cos\beta = \frac{Y}{R} \quad 3$$

$$\sin\alpha = \frac{b}{y} \quad 4$$

where α=the scarf angle and R is the radius of the third duct.

The point P has been deflected to the left by a distance x at a distance y sin α from the intersection of axis 25 and axis 27 in a plane parallel to the plane of bearing 24. Although the distance x finally does not lie in a plane parallel to the plane of bearing 24, the original deflection x (which the rotation of the second duct 22 must counteract) is in a plane parallel to that of bearing 24. To maintain the direction of jet efflux in the vectoring plane, the deflection of the point N to the right must equal the deflection of the point P to the left at the same distance along the line 27 in a plane parallel to the plane of the bearing 24. Therefore, a must equal x.

Substituting equations 2, 3, 4 into equation 1 gives:

$$\tan\theta = \tan\beta/\sin\alpha \quad 5$$

The knowledge of the relationship between θ and β enables the shape of the cam 34 to be determined after the various gear ratios in the epicyclic gear train 30 have been chosen. It is also possible to use the cam 34 to compensate if the only gear ratios available are not the optimum choice. It should be noted that the third duct has rotated through an angle of 2β relative to the second duct.

The relationship between the scarf angle α, the angle β and the angle through which the nozzle is rotated is evaluated below.

Figure 6:
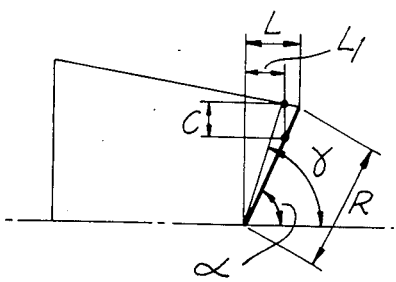
FIG. 6 is another view in the direction of arrow A in FIG. 5d.

Referring to FIG. 6:

$$\cos\alpha = L/R \quad 6$$

where L is the distance along axis 25 from the intersection of axis 27 and axis 25 to the edge of the bearing 26 furthest away from the bearing 24.

$$c = R\sin\alpha - R\cos\beta\sin\alpha \quad 7$$

where C is the difference in height between the position of point P after the nozzle has been vectored through an angle and the second and third ducts 22,23 have been rotated such that the thrust has remained in its original vertical plane, and the position of point P after only the initial rotation of the third duct through the angle β.

$$L_1 = R\cos\alpha - (c/\tan\alpha) \quad 8$$

where $L_1$ is the distance from the intersection of axis 27 and axis 25 to the highest point of bearing 26 after the rotation of both the second and third ducts 22,23 to vector the nozzle as described above.

Also $$\cos \gamma = L_1/R \quad\quad\quad 9$$

where $$\gamma = \alpha + \hat{V}/2$$

and $\hat{V}$ = the angle through which the gas efflux issuing from the nozzle has been directed from the position in which the gas efflux was directed downward (FIG. 5a) to a second position on which a component of the jet efflux is directed rearward (FIG. 5c).

Substituting equation 8 into equation 9:

$$\cos\gamma = \frac{R\cos\alpha}{R} - \frac{c}{R\tan\alpha}$$

$$\cos\gamma = \cos\alpha - \frac{R\sin\alpha - R\cos\beta\sin\alpha}{R\tan\alpha}$$
(using equation 7)

$$\cos\gamma = \cos\alpha - \cos\alpha + \cos\beta\cos\alpha$$

$$\cos\gamma = \cos\beta\cos\alpha$$

I claim:

1. A vectorable exhaust nozzle for a gas turbine engine comprising:
   a first duct;
   a rotatable second duct having an upstream end substantially parallel with a downstream end of the first duct;
   a first bearing means for attaching the downstream end of the first duct to the upstream end of the second duct to allow the second duct to be rotatable about a longitudinal axis perpendicular to the plane of the first bearing means, the second duct terminating at a downstream end in a plane which lies at an acute angle $\alpha$ to the longitudinal axis;
   a rotatable third duct having an upstream end substantially parallel with the downstream end of the second duct and terminating in an orifice from which an exhaust gas stream issues;
   a second bearing means for attaching the downstream end of the second duct to the upstream end of the third duct to allow the third duct to be rotated about an axis perpendicular to the plane of the second bearing means;
   actuating means for rotating the second duct;
   and epicyclic transmission means mounted on and rotatable with the second duct comprising: a first input member operable to drive the epicyclic gear train when the second duct is rotated, a first co-operating means, including a member fixed to the first duct, adapted to drive the first input member, an output member operable to be driven by the epicyclic gear train, a second co-operating means including a member fixed to the third duct adapted to be driven by the output member and thereby rotate the third duct in an opposite direction to rotation of the second duct and simultaneously therewith, and a third co-operating means operable on a second input member adapted to also drive the epicyclic gear train and thereby vary the velocity ratio between the first input member and the output member as a function of an angle $\theta$ through which the second duct is rotated by the actuating means.

2. A nozzle as claimed in claim 1 wherein the nozzle is adapted to deflect the exhaust gas stream through an angle V from a first position of maximum deflection of the exhaust gas stream away from the longitudinal axis of the second duct to a second position by rotating the second duct through said angle $\theta$ relative to the first duct and rotating the third duct through an angle $\beta$ relative to the first duct according to the relationship:

$$\tan\theta = \tan\beta/\sin\alpha.$$

3. A nozzle as claimed in claim 2 wherein the nozzle is further adapted to deflect the exhaust gas stream according to the relationship:

$$\cos(\hat{V}/2\alpha) = \cos\beta\cos\alpha.$$

4. A nozzle as claimed in claim 1 wherein the third co-operating means comprises a cam follower adapted to engage a cam track that extends circumferentially at least part of the way around and is mounted on the first duct.

5. A nozzle as claimed in claim 4 wherein the transmission means further comprises: a sun pinion being the output member, a plurality of planet pinions in mesh with the sun pinion, a rotatable cage structure on which the planet pinions are mounted for rotation, the cage structure being the first input member, and an annular gear in mesh with the planet pinions being the second input member to which the cam follower is attached.

6. A nozzle as claimed in claim 1, wherein the first co-operating means comprises an input pinion which engages a first gear-toothed rack that extends circumferentially at least part of the way round the first duct and is attached thereto, and the second co-operating means comprises a second pinion which engages a second gear-toothed rack that extends circumferentially at least part of the way round the third duct and is connected thereto.

7. A nozzle as claimed in claim 1 wherein the actuating means comprises motor means operable to rotate a pinion in mesh with a gear toothed rack which extends circumferentially at least part of the way round the second duct and is connected thereto.

8. A nozzle as claimed in claim 1 wherein the downstream end of the second duct is of a circular cross-section when viewed in a direction perpendicular to the plane in which it terminates, and the upstream end of the third duct is also of circular cross-section when viewed in a direction perpendicular to the plane in which it terminates.

* * * * *